HENRY SILVESTER.
Improvement in Tire for Carriage Wheels.
No. 125,341.        Patented April 2, 1872.
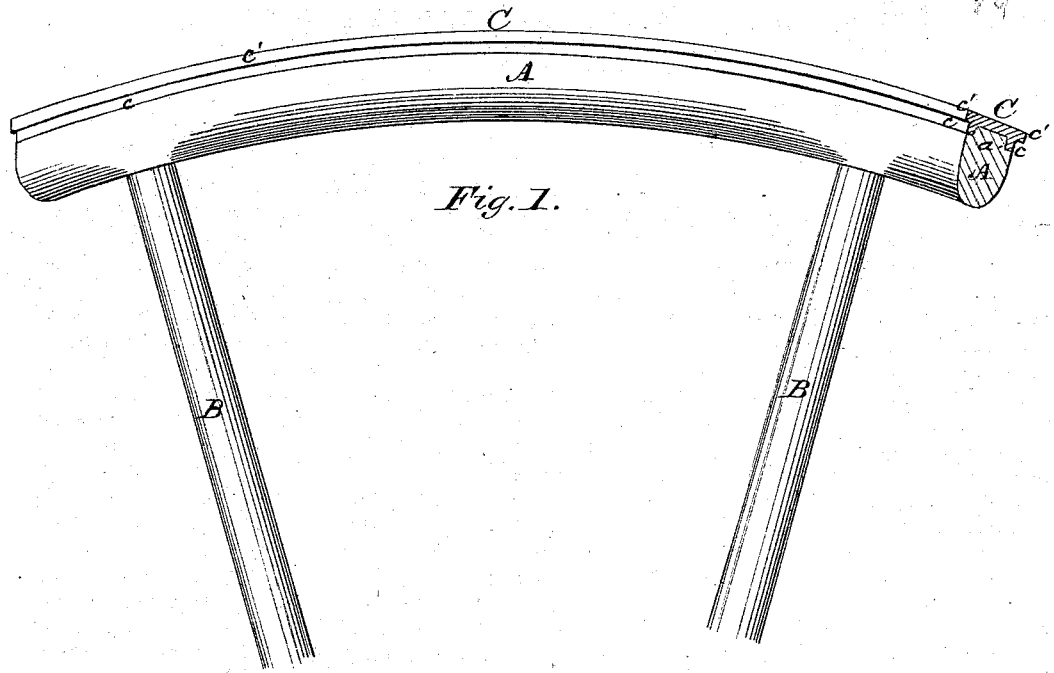
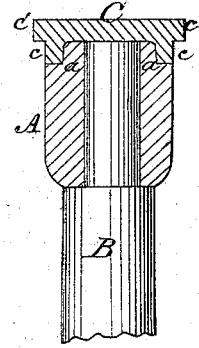

UNITED STATES PATENT OFFICE.

HENRY SILVESTER, OF ST. LOUIS, MISSOURI.

IMPROVEMENT IN TIRES FOR CARRIAGE-WHEELS.

Specification forming part of Letters Patent No. 125,341, dated April 2, 1872.

*To whom it may concern:*

Be it known that I, HENRY SILVESTER, of St. Louis, in the county of St. Louis and in the State of Missouri, have invented new and useful Improvements in Carriage-Wheel Tires; and do hereby declare that the following is a full, clear, and exact description thereof, reference being had to the accompanying drawing making a part of this specification, in which—

Figure 1 is a side elevation of a section of a wheel containing my improvement; and Fig. 2 is a cross-section of a felly and tire of the same.

Letters of like name and kind refer to like parts in each of the figures.

My invention is an improvement in the construction of wagon-tire, by means of which increased strength, durability, and security of attachment are secured, and a reduction in the weight of metal rendered practicable; and it consists principally in a carriage-tire provided with vertical and lateral flanges, substantially as and for the purpose hereinafter specified. It consists, further, in the combination of a felly provided with rabbets within its upper corners, with a tire provided with vertical and lateral flanges, substantially as and for the purpose hereinafter set forth.

In the annexed drawing, A represents the felly, and B the spokes of a carriage-wheel of ordinary construction, except that within each of the upper corners of said felly is formed a rabbet, *a*, having its lower side horizontal, while its inner side or face inclines inward and upward, as shown. Encircling the outer side or periphery of the fellies is a tire, C, upon or within the inner face of which are two flanges, *c*, which correspond in size, shape, and position to the like features of the rabbets *a*, and, projecting radially inward, fill the same so as to confine said tire and felly in relative lateral position. Other flanges, *c'*, projecting horizontally outward from either edge of the tire, complete the same, which is expanded by heat and shrunk upon the wheel in the usual manner, and when in position is held without the use of bolts or rivets.

The especial advantages possessed by this construction and attachment of the tire are: First, by means of the lateral and vertical flanges a material increase of strength is secured, so as thereby to enable a less weight of metal to be employed. Second, the lateral flanges receive all side wear that would otherwise come upon and scar or in other manner mutilate the fellies, by which means the durability of said parts is increased, and a less frequent renewal of paint upon said fellies rendered necessary. Third, by means of the vertical flanges the tire and wheel are so firmly united as to require the employment of neither bolts or rivets, while the inward pressure of said flanges upon the fellies effectually prevents the same from splitting, and thereby materially increases their durability. Fourth, by making the inner edges of the vertical flanges square instead, as has heretofore been the case, of leaving them sharp and thin, all difficulty from the wrinkling of said flanges as they pass through the tire-bending machine is avoided, and no liability exists of their injury from heating.

Having thus fully set forth the nature and merits of my invention, what I claim as new is—

1. In a carriage-tire, provided with vertical flanges for holding the same in position upon the wheel, a flange projecting laterally outward beyond the fellies from either side, substantially as and for the purpose specified.

2. The combination of the fellies A provided with the rabbets *a*, with the tire C provided with the flanges *c* and *c'*, substantially as and for the purpose set forth.

In testimony that I claim the foregoing I have hereunto set my hand this 12th day of January, 1872.

HENRY SILVESTER.

Witnesses:
CHAS. D. MOODY,
FREDK. LEAR.